United States Patent [19]

Brunel et al.

[11] Patent Number: 5,248,523
[45] Date of Patent: Sep. 28, 1993

[54] METHOD FOR COATING AN INCLINED SURFACE WITH POWDER

[75] Inventors: Gérard Brunel, Auvers s/Oise; Henri Gueydan, Veurey Voroize; Hassan Youssef, Taverny, all of France

[73] Assignee: Sintertech of Tour Manhattan, Courbevoie, France

[21] Appl. No.: 737,722

[22] Filed: Jul. 30, 1991

[30] Foreign Application Priority Data

Aug. 2, 1990 [FR] France .................. 90 10488

[51] Int. Cl.⁵ .............................. B05D 1/12
[52] U.S. Cl. .................. 427/181; 427/180; 427/201; 427/203; 427/310; 264/112; 419/8
[58] Field of Search ............ 427/180, 181, 203, 239, 427/319, 327, 190, 191, 201, 310; 264/60, 112, 113, 127, 265, 269; 419/8; 29/527.2, 527.4

[56] References Cited

U.S. PATENT DOCUMENTS

| | | | |
|---|---|---|---|
| 2,287,952 | 6/1942 | Tormyn | 419/8 |
| 3,027,269 | 3/1962 | Teshima et al. | 427/310 |
| 3,037,860 | 6/1962 | Masterson et al. | 419/6 |
| 3,492,120 | 1/1970 | Haller | 419/8 |
| 4,657,734 | 4/1987 | Yamada et al. | 419/9 |
| 4,931,117 | 6/1990 | Muller et al. | 156/89 |
| 4,940,565 | 7/1990 | Müller | 419/2 |

FOREIGN PATENT DOCUMENTS

| | | |
|---|---|---|
| 1251104 | 4/1958 | Fed. Rep. of Germany. |
| 1458291 | 12/1968 | Fed. Rep. of Germany .......... 419/8 |
| 61-26705 | 2/1986 | Japan ....................... 419/8 |
| 63-219507 | 9/1988 | Japan ....................... 419/8 |
| WO89/10432 | 11/1989 | PCT Int'l Appl. .......... 427/190 |

Primary Examiner—Terry J. Owens
Attorney, Agent, or Firm—Dennison, Meserole, Pollack & Scheiner

[57] ABSTRACT

A method for coating an annular inclined surface of a part with a powder prior to sintering, in which a lower annular axial surface is provided below and extending the inclined surface of the part. Along the axis of the part, a central tool is arranged having a lower axial surface slidable relative to the lower annular axial surface and an annular inclined surface above the lower axial surface and facing the annular inclined surface of the part. The part and the tool define an annular gap which is closed at the bottom portion and which has an open annular upper end above the annular inclined surface and the inclined surface of the part. The annular gap is filled with a powder through the open upper end which is then closed, and the part with the lower annular axial surface and the central tool are then relatively displaced, causing the inclined surface of the part and the annular inclined surface to become closer and compress the powder against the annular inclined surface of the part.

11 Claims, 2 Drawing Sheets

METHOD FOR COATING AN INCLINED SURFACE WITH POWDER

BACKGROUND OF THE INVENTION

The invention concerns the coating of inclined surfaces with powders, for example to form friction layers on friction rings for clutches or brakes, synchro rings. According to the invention such a layer is applied and compressed in situ before being sintered.

The preamble of specification DE-C-3417813C1 describes several friction coatings in powder form, particularly a friction member with two friction layers deposited and sintered onto a sub-layer of sheet metal as disclosed in DE-PS-1251104.

Applicants have sought to perfect a convenient and economic method of forming such friction layers prior to sintering them, particularly in the case of synchro rings with frustoconical friction surfaces.

SUMMARY OF INVENTION

The invention relates to a method of coating a first member comprising an inclined surface to be coated with powder, characterised in that:

a) a member with a lower vertical surface is, if appropriate, arranged below said member to be coated, said vertical surface continuing said inclined surface;

b) a gap with its lower end closed is formed by means of a second member, the closed end being located between said inclined surface, said lower vertical surface and said second member, the upper end of said gap being open;

c) said gap is filled with powder through said upper open end;

d) said upper end is closed;

e) and either the first member and, if appropriate, said member with a lower vertical surface or the second member are displaced vertically so as to reduce the volume of said gap, the powder then being compressed against said inclined surface.

If the first member does not have a lower vertical surface which will act as a guiding means in this process, it is joined rigidly to a member with a vertical bearing surface which will form a continuation of the bottom of its inclined surface, with or without an offset portion, enabling the second member to slide vertically against that bearing surface. The previously used expression "if appropriate" means "if there is no such lower vertical surface on the first member".

The inclined surface to be coated with powder generally forms an angle of 3° to 30°, and more typically 4° to 15°, with the vertical direction, which is that of the axis of revolution in the case of a synchro ring with a frustoconical friction surface. The compressed powder coating obtained is typically from 0.3 to 5 mm thick.

In the invention a kind of inclined drawer is formed on the surface to be coated, and a large surface thereof is displaced vertically. This greatly reduces its internal volume by reducing its thickness and also shortening it, and hence the powder contained is compressed on the actual surface to be coated.

Two or three successive layers of different types and/or with a different particle size distribution can be deposited and compressed in this way. When the surface to be coated has exposed side edges, the powder-filling and compression gap has to be closed laterally by means which each slide over one of the two surfaces of the "drawer", that is to say, over the inclined surface to be coated or the surface opposite the second member. The surface to be coated is most typically annular and often frustoconical, so there is then no need for such lateral closures.

An important advantage of the process is the possibility of adjusting the amount of compression applied to the powder. A constant amount of compression may be applied over the whole variable area by changing the distance between the surface opposite the second member and said surface to be coated, at least locally. In a synchro ring a problem of lubrication varying with differences in speed thus can be dealt with, for example by forming a larger initial width and thus having less compression, and possibly by using powder with a different particle size distribution in the upper part of the "inclined drawer". Compression between the bottom and the top of the inclined surface may be modified continuously, by inclining the inner surface of the second member, or the surface opposite the inclined surface, to the inclined surface.

The normally metallic inclined surface to be coated is previously prepared to key on the layer of powder thus distributed and compressed, by dipping and sanding, or by forming scores or contours, or else holes for anchoring the layer of powder. The member coated with compressed powder is then subjected to thermal sintering treatment; in order to provide a very good key for the layer of compressed and sintered powder it is preferable, as a preliminary preparation for keying, to coat the member with a braze welding suspension which is oxidised then reduced, typically as follows:

by degreasing and/or sanding the surface to be coated, and coating it with a suspension (11) of braze welding powder in an organic liquid;

by eliminating any trace of carbon from the coating, through hot oxidisation of the coating, typically at from 300° to 550° C.;

by reducing the oxides then formed through heat treating the member thus coated in a reducing atmosphere, typically at from 600° to 1000° C., thus obtaining excellent adhesion between the compressed powders and the surface thus treated and a very good coating bond after sintering.

The invention also concerns the apparatus for coating the inclined surface of a first member by the method described above. This apparatus comprises at least:

A) said inclined surface to be coated and a lower vertical surface continuing therefrom; the lower surface may or may not form part of the first member;

B) a compressing member, or second member, with an inclined surface facing said inclined surface to be coated, and a lower vertical surface which can slide over the lower vertical surface associated with the first member:

C) a means for closing the bottom of the gap between said inclined surfaces of the first and second members;

D) a means for closing the top of that gap, to be put into position when said gap has been filled with powder: one of said two inclined surfaces being adapted to be displaced vertically simultaneously with one of said closing means, so as to reduce the volume of said gap and thus compress the powder contained therein.

The main features of the method and apparatus will be described in the examples.

DESCRIPTION OF THE PREFERRED EMBODIMENTS

Figure 1:
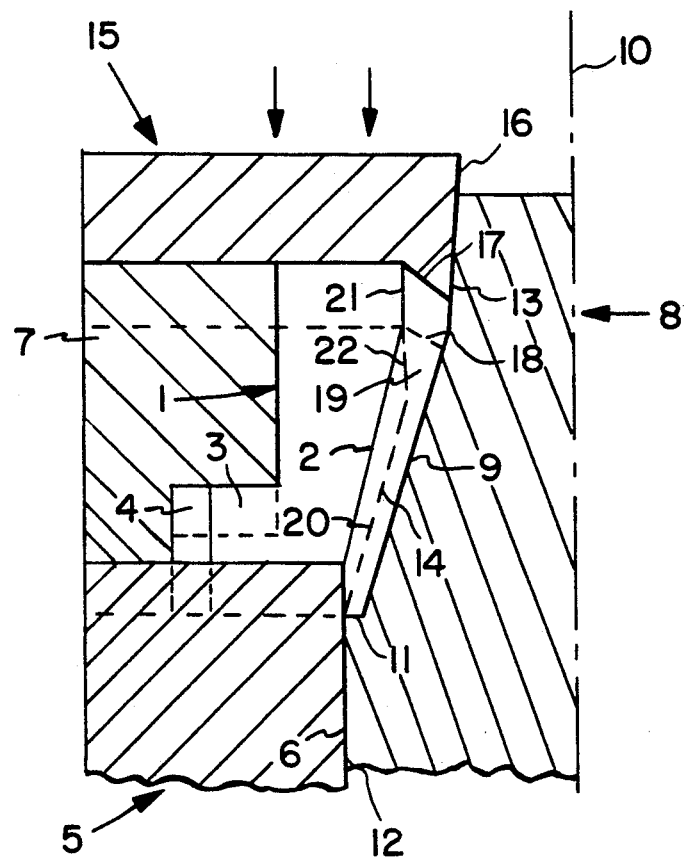
FIG. 1 shows a friction member with a taper hole, being coated with powder, in an axial half-section with only the tools shown in section.

1) First Example (FIG. 1)

The steel member 1 has an inclined frustoconical surface 2 with a vertical surface 21 at the top—a friction layer will be applied to the surfaces 2 and 21—and a base 3 of larger diameter carrying teeth 4. The surface to be coated 2 and 21 has been given preparatory surface-keying treatment by braze welding as described above. The surface 2 is inclined to the axis of revolution 10° by 8°; the approximately vertical surface 21 will provide a support for the upper thickened portion of the final coating 19.

The member 1 rests on a lower annular post 5, which has a lower vertical surface 6 continuing the frustoconical surface 2. It is centred and guided by an outer annular tool 7. The second member 8 is a central pin 8 with a frustoconical surface 9, inclined to the axis 10 slightly more than the surface 2 is, and after an offset portion 11, a lower vertical surface 12 which can slide inside the lower vertical surface 6.

The pin 8 also has a cylindrical vertical surface 13 above its frustoconical surface 9.

The tools 5 and 8 are thus in position. Their effective surfaces 6, 11, 9 and 13 define an annular gap or powder chamber 14 together with the surface 20 and 21 to be coated. The gap 14 has been filled with powder through its open annular end located between the vertical surface 13 of the pin 8 and the span 21 of the member 1.

The open end (21, 13) is then closed by a rigid upper member 15, the inner edge 16 of which slides axially around the cylindrical vertical surface 13 of the pin 8. The portion 17 for closing the gap 14 is arranged obliquely, in order to create a bevel 18 at the upper end of the layer of compressed powder 19. The upper member 15 is lowered, taking with it the members 1, 7 and 5. The pin 8 remains stationary and the descending movement is stopped just before the edge 16 abuts the upper end of the frustoconical surface 9 of the pin 8. The positions of the member 1 and tools 15 and 7 are shown in broken lines in FIG. 1; 20 and 22 indicate the new positions of the surfaces 2 and 21. It will be seen that the cross-section through the new gap "18, 22, 20, 11, 9" is less than half the size of the initial gap 14; this indicates the amount of compression applied to the friction powder on the surface 20 and 21 which has been treated to ensure excellent keying.

Figure 2:
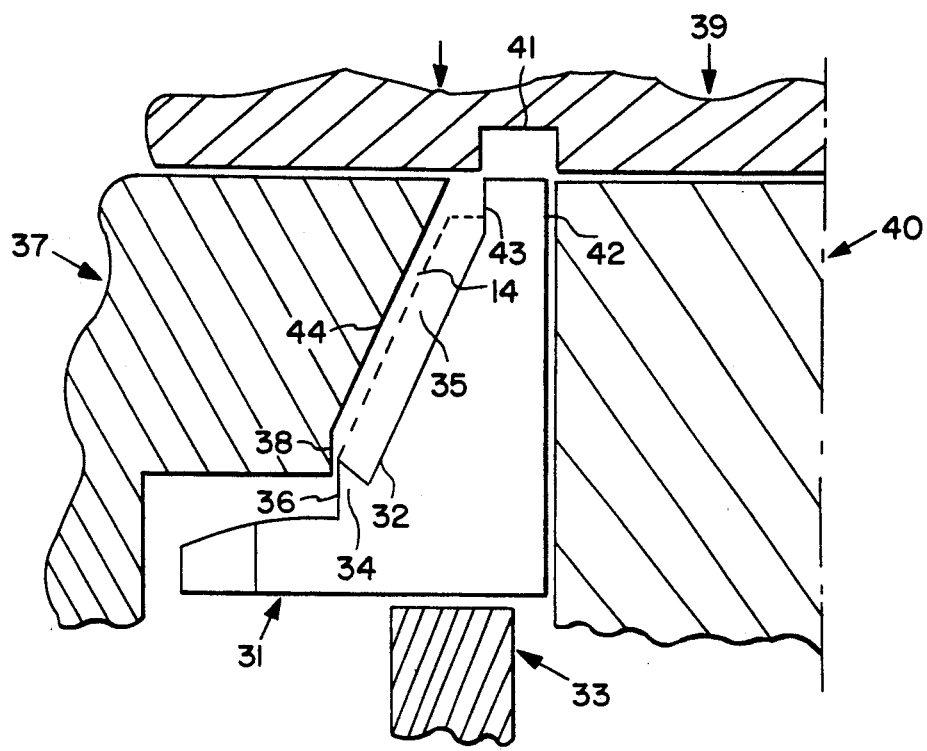
FIG. 2 shows a second friction member where the outer frustoconical surface has to be coated with powder, in an axial section through the tools.

2) Second Example (FIG. 2)

The steel member 31 has an outer inclined frustoconical surface 32 to which a friction layer is to be applied. The surface is prepared as previously. The member 31 rests on an annular support 33 which has no particular function in the coating process. The member 31 has a protrusion 34 to retain the layer of powder 35 which will be inserted; the protrusion has an outer vertical guiding and closing surface 36. The second member 37 or compression member is annular and located outside the member 31. It has a vertical inner surface 38 which can slide around the guiding surface 36, and a surface 44 opposite the surface 32 to be coated, at 10° to the axis, as is the surface 32.

The position for filling the initial gap 14 is that of the members 31 and 37 in FIG. 2.

The upper end of the gap 14 is closed by means of an upper member 39. This bears, within the member 31, on a "dummy pin" 40 which assists the axial lowering action, since diameters are important here.

To complete the guiding of the lowering action, the member 39 contains an annular groove 41. This fits and slides around the upper end of the member 31, which has vertical surfaces 42 and 43.

For the compression step, the upper member 39 thus guided takes the second member 37 downwards with it. The position of the gap obtained is shown in broken lines in the figure. This thinner and shorter gap 35 is about 1.7 times smaller in volume than the initial one.

Figure 3:
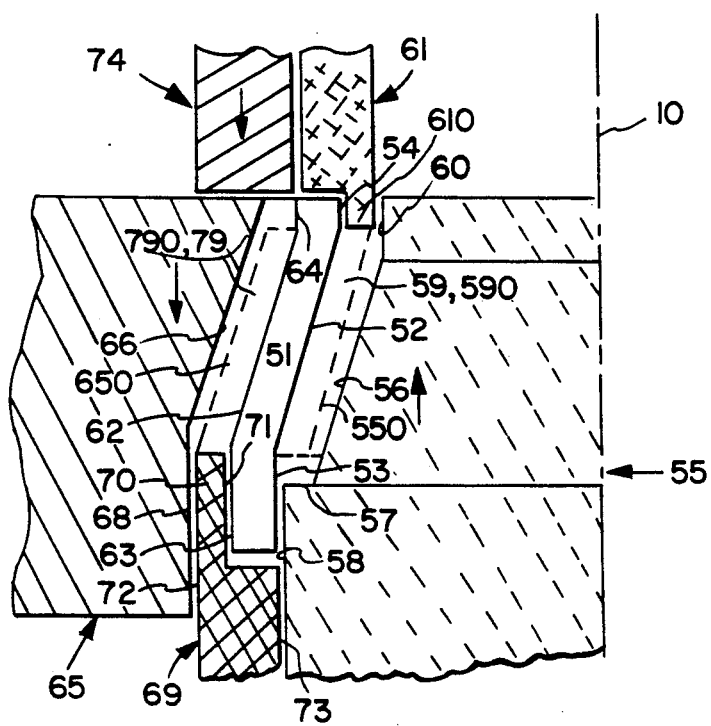
FIG. 3 shows a synchro friction ring where the two frustoconial surfaces have to be coated with powder, in an axial section through the tools.

5) Third Example (FIG. 3)

This example concerns the production of a dual surface synchro ring. The initial member 51 is a ring 51 of shaped sheet steel with two inclined frustoconical surfaces 52 and 62. Each of these surfaces is located between an upper and lower vertical end portion, 53, 54 and 63, 64 respectively. The large inner surface 53, 52, 54 and the large outer surface 63, 62, 64 are previously given degreasing treatment and covered with a suspension of braze welding powder to provide a good key for the coatings, which are green after compression then fritted.

The compressing member for the inclined inner surface 52 is a central pin 55 with a frustoconical surface 56 inclined at 12° to the axis of revolution 10. It has a shoulder 57 at its base, which closes the gap 59 for filling in the powder, then a vertical guiding surface 58. The stepped pin 55 has an upper vertical cylindrical surface 60, which will slide along an upper member 61 for closing the gap 59, bearing on the upper end of the ring 51.

The compressing member 65 for the outer surface 62 is annular external with an inclined inner frustoconical surface 66 and below a vertical guiding surface 68. It is guided by an annular member 69 with an end portion 70. The end portion 70 has an inner vertical surface 71 which bears against the lower portion 63 of the outer surface of the ring 51 to be coated, and an outer vertical surface 72 provided to guide the vertical surface 68 of the member 65. It will noted that the member 69 has another inner vertical surface 73 to complete the guidance of the pin 55. On this outer surface of the ring 21, the apparatus is completed by an annular closing member 74. This bears on the top of the compressing member 65 and will close the open upper end 64, 66 of the annular gap 79 for filling the powder.

Inside the ring 51, once the gap 59 has been filled with friction powder and the closure 61 put into position with its lower portion 610 inserted between the vertical surfaces 54 and 60 of the ring and pin, compression is obtained by raising the pin 55 axially (arrow). The edge of the shoulder 57 and the upper end of the frustoconical surface 56 respectively abut the bottom of the inclined surface 52 of the ring 51 and the lower end of the closure 610. The effective profile of the pin 55 is shown by a broken line 550. Together with the surfaces 52 and 53 of the ring 61, it defines a new gap and an annular section 590 of compressed powder reduced to about 65% of its initial volume.

Outside the ring 51, compression is effected by displacing the closure member 74 and annular compression member 65 axially downwards (arrows). The stopping position is defined at 0.5 mm from the place of abutment between the matrix 65 and the upper end of the portion 70 of the stationary guiding member 69, and between the member 74 and the beginning of the inclined surface 62 of the ring 51. The profile of the members 65 and 74 when they stop is shown by a broken line 650; it defines the annular section of compressed powder 790 obtained.

It is advisable to carry out the internal and external compression simultaneously so as to balance the stresses on the friction ring. This helps to obtain both good geometrical definition for the dual surface friction ring and good long-time strength for its friction layers.

Notes and Advantages

The examples demonstrate the flexibility of the process.

It is simple to adjust the amount of compression, particularly relative to a change in the inclination of the surface over which a tool or the member itself slides.

The choice of which member should be displaced to obtain compression, the member itself or the so-called compressing member, can generally be reversed. The preferred choices, which are those in the examples, are the result of research into improving guidance.

The possibility of varying the amount of compression gradually or locally has already been mentioned, as has the possibility of forming superimposed compressed layers on an inclined surface to be coated.

Industrial Applications

The invention is applied particularly to the production of friction members, for example friction or "synchro" rings. It enables the grade of friction layers thereon to be varied, improves the keying of the layers and provides a simpler, reproducible method of obtaining them.

We claim:

1. A method of coating an annular inclined surface (2) of a part (1), with a powder prior to sintering, comprising the steps of:
    a) providing a lower annular axial surface (6) arranged below said inclined surface (2) of said part (1) and extending said inclined surface of said part;
    b) arranging along the vertical axis (10) of said part a central tool (8) having a lower axial surface (12) slidable relative to said lower annular axial surface (6) and an annular inclined surface (9) above said lower axial surface and facing said annular inclined surface of said part, said part and said tool defining an annular gap (14) which is closed at a bottom portion by said lower annular axial surface (6) and said lower axial surface (12), and has an open annular upper end (21) above said annular inclined surface (9) and said inclined surface (2) of said part;
    c) filling said annular gap (14) with a powder through said open upper end (21);
    d) closing said open upper end (21); and
    e) axially displacing said part relative to said central tool (8), causing said inclined surface (2) of said part and said annular inclined surface (9) to become closer, reducing the annular gap (14) in length and width and compressing the powder against the inclined surface (2) of said part.

2. The method of claim 1, wherein the step of axially displacing comprises sliding said lower annular axial surface (6) and said lower axial surface (12) over one another.

3. The method of claim 1, wherein the upper end of said annular gap (14) is closed with an upper rigid member (15), said central tool (8) having an upper axial surface (13) and said upper rigid member (15) having an internal axial surface (16) that slides around said upper axial surface (13) when the part (1) is axially displaced relative to the central tool (8).

4. The method of any one of claims 1, 2 or 3, wherein the inclined surface of the part (2) is inclined at 3 to 30° C. to the part's vertical axis (10).

5. The method of any one of claims 1, 2, or 3, wherein steps c) to e) are repeated so that a coating comprising at least two layers of different powders and/or powders with different particle size distributions is formed on said inclined surface (2) of said part.

6. The method of any one of claims 1, 2 or 3, wherein the amount of compression applied to the powder over the area of the inclined surface (2) of the part is varied by varying the distance between the tool and said inclined surface of the part.

7. The method of any one of claims 1, 2 or 3, wherein the part (1; 31; 51) is metallic, and the inclined surface thereof is previously prepared by degreasing, covering with a suspension of braze welding powder, oxidising at from 300° to 550° then treating in a reducing atmosphere at from 600° to 1000° C.

8. The method of claim 1, wherein said lower annular axial surface (6) is an element of said part (1).

9. The method of claim 1, wherein said lower annular axial surface (6) is an element of an additional part (5) disposed below said part (1).

10. The method of claim 1, wherein said part comprises a shaped ring (51) having an inner inclined surface (52) and an outer inclined surface (62), additionally comprising the steps of:
    a) arranging below said shaped ring a member (69) extended by a vertical portion (70) having an inner surface (71) which bears against a lower portion of said outer inclined surface (62), and an outer surface (72);
    b) arranging externally of said ring (51) an annular tool (65) having an internal annular inclined surface (66) above an internal lower axial surface (68), said internal annular inclined surface (66) facing said outer inclined surface (62), said ring (51), said member (69) and said annular tool (65) thereby defining an annular outer gap (79) having an open outer annular end;
    c) filling said annular outer gap (79) with a powder through said open outer annular end;
    d) closing said open outer annular end with a closing tool (74) abutting said annular tool (65); and
    e) axially displacing said closing tool (74) and said annular tool (65) downwardly, said internal annular inclined surface (66) of said annular tool (65) moving closer to said outer inclined surface (62) and compressing the powder in said outer annular gap (79),
    said central tool (8) being disposed internally of said ring.

11. The method of claim 10, wherein said central tool is displaced axially upwardly at the same time the annular tool (65) is displaced axially downwardly, both relative to the shaped ring (51).

* * * * *

UNITED STATES PATENT AND TRADEMARK OFFICE
CERTIFICATE OF CORRECTION

PATENT NO. : 5,248,523

DATED : September 28, 1993

INVENTOR(S) : Gerard Brunel et al

It is certified that error appears in the above-identified patent and that said Letters Patent is hereby corrected as shown below:

Column 6,
Claim 4, line 3, delete "C."

Signed and Sealed this

Twenty-eighth Day of June, 1994

Attest:

BRUCE LEHMAN

*Attesting Officer*          *Commissioner of Patents and Trademarks*